B. Hotchkiss,
Trip Hammer,
No. 2,389, Reissued Nov. 6, 1866.

Witnesses.
Henry Cutler
Geo. H. Babcock

Inventor
Benjamin Hotchkiss

B. Hotchkiss,
Trip Hammer,
No. 2,389, Reissued Nov. 6, 1866.

Witnesses

Henry Dutton

Geo. A. Wabon

Inventor.

Burnett Hotchkiss

UNITED STATES PATENT OFFICE.

BENNET HOTCHKISS, OF NEW HAVEN, CONNECTICUT, ASSIGNOR, THROUGH MESNE ASSIGNMENTS, TO HIMSELF.

IMPROVEMENT IN TRIP-HAMMERS.

Specification forming part of Letters Patent No. 24,428, dated June 14, 1859; Reissue No. 2,389, dated November 6, 1866.

*To all whom it may concern:*

Be it known that I, BENNET HOTCHKISS, of the city and county of New Haven, and State of Connecticut, have invented a new and useful Improvement in Hammers; and I do hereby declare that the same is fully described and represented in the following specification and the accompanying drawings, in which—

Figure 1:
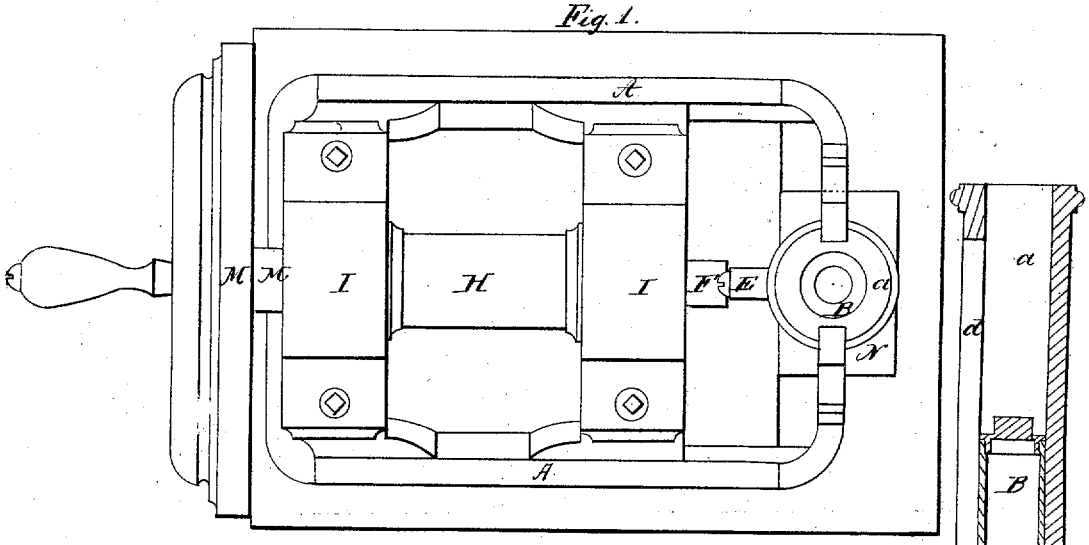
Figure 1:
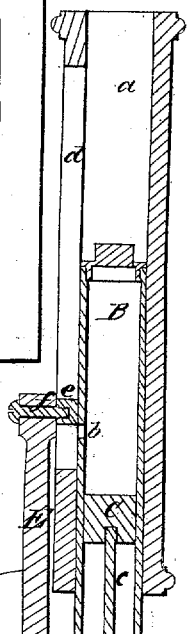
Figure 3:
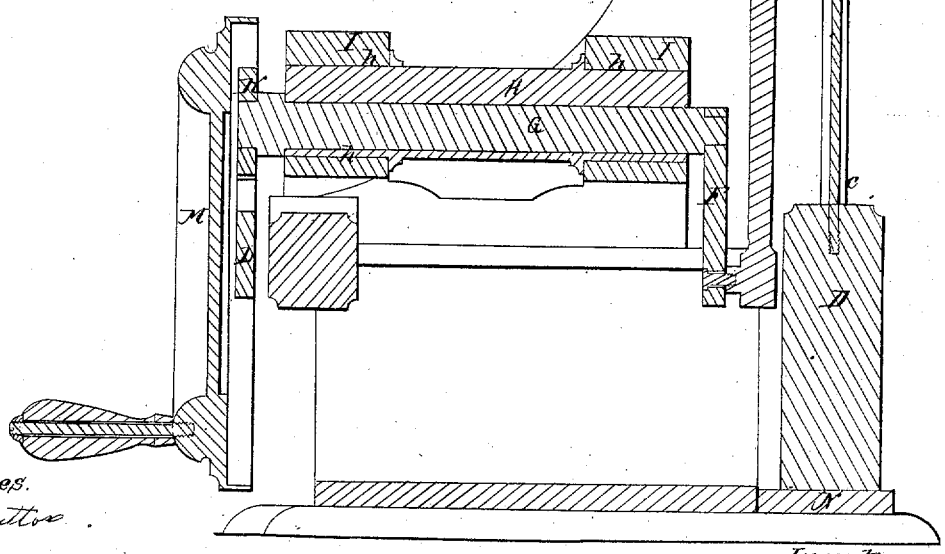
Figure 2:
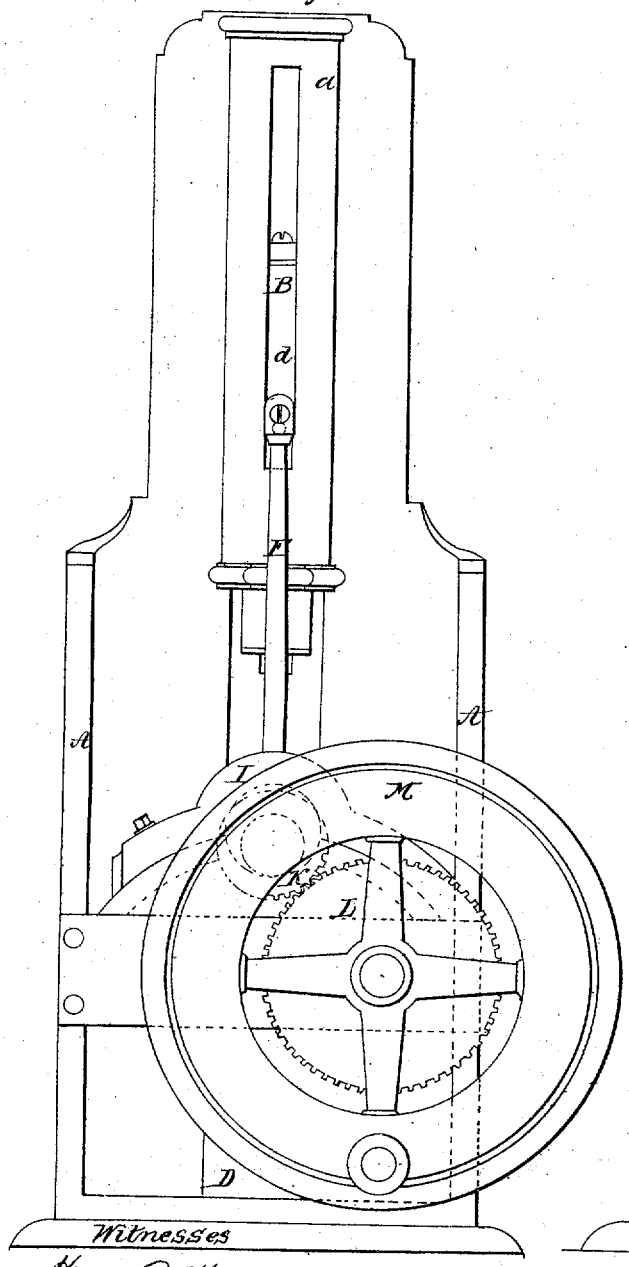
Figure 4:
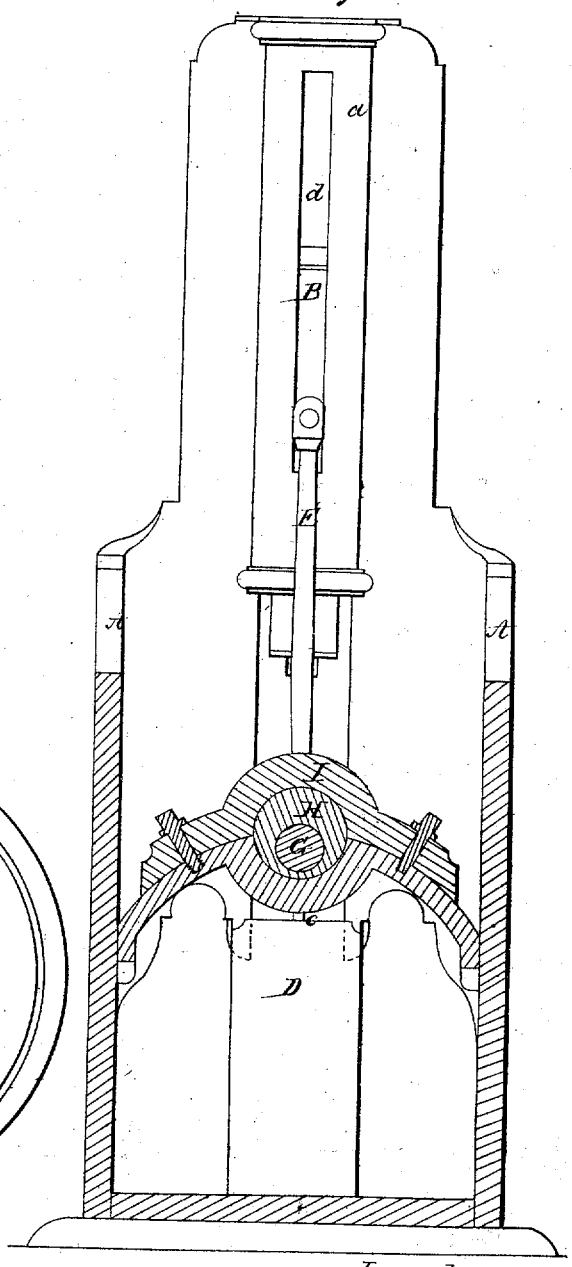

Figure 1 is a plan of my hammer. Fig. 2 is a rear elevation, and Fig. 3 a vertical central and longitudinal section, of the same. Fig. 4 is a transverse section of my hammer, taken through the crank-shaft, the eccentric shaft, and one of the bearings at the line *x x*, Fig. 3.

The invention which is the subject of this patent consists, first, in combining the hammer with its actuating mechanism by means of an elastic connection, as an air-spring, or its equivalent, whereby the hammer can be lifted, and in turn permitted to strike its blow without communicating a shock to such mechanism; and, secondly, in an elastic connection, in combination with the hammer, to which connection is imparted a movement coincident with the movement of the hammer in point of direction, but which relatively thereto shall be faster when the force of the blow is to be increased, and slower when it is to be diminished, whereby the force of the hammer or its effective blow is accelerated or retarded.

In the drawings, A exhibits the supporting-frame for the hammer and its operative mechanism, the upper part, *a*, of the said frame being constructed tubular or in a suitable form to receive and guide a (air-spring) cylinder, B, to form the pneumatic spring. This air-spring cylinder is constructed like the cylinder of a common steam-engine, with the exception that, instead of having pipes or passages opening into its opposite ends, it has but one hole or passage, *b*, made through its side and about midway between the two heads of the cylinder.

C is a piston in the cylinder, and its rod *c* extends through the lower head of the cylinder, and is attached to a hammer, D, as shown in the drawings. There is a long slot, *d*, formed through the side of the rear portion of the guide *a*, such slot being for receiving and guiding a projection, *e*, from the cylinder.

A journal, *f*, extends from the same projection *e*, and receives a connecting-rod or pitman, E, whose lower end is connected to a crank, F, at one end of a horizontal shaft, G. The said shaft G runs longitudinally through another shaft, H, the axis of the shaft G being eccentric with reference to that of the shaft H. The latter shaft, H, has its journals *h h* supported, respectively, in boxes I I, carried by the frame A, as shown in the drawings.

On the end of the shaft G a toothed pinion, K, may be fastened, the said pinion being made to engage with a larger gear, L, fixed on the axle or arbor of a fly-wheel, M. By putting the said fly in revolution rotary motion will be imparted to the shaft G, whereby the crank F and connecting-rod E will impart a rapid reciprocating movement to the pneumatic cylinder or spring B, and in consequence of the same the hammer will be lifted from and forced downward toward the anvil N, or any article thereon, by the compression of air in the opposite halves or portions of the cylinder—that is, during each elevation or depression of the cylinder the piston will pass by the air-passage *b* and compress all the air that may be contained in the cylinder and between said passage and that head of the cylinder which may be approaching the piston. This compression of the air while the cylinder is ascending will operate as a spring to gradually overcome the inertia of the trip-hammer and lift the same.

During the descent of the cylinder the air or spring will be compressed and operate to accelerate the downward movement of the piston. By this means the hammer may be worked with a series of rapid accelerated strokes; and, from the fact that a spring of great elasticity is interposed between the hammer and its operative mechanism, no injurious shock, either from overcoming the inertia of the hammer when lifting or from the sudden arrest of its movement when falling, will be experienced by the machine.

It is obvious from the foregoing that in place of the cylinder filled with atmospheric air requiring a closely-fitting head to confine the air while under compression, and to make the reaction effective for the purpose mentioned, the same effect in kind can be produced by the introduction of spiral springs upon each side of the piston, in which case it would be unnecessary to have closely-fitting heads to the cylinder; so, also, the use of mechanical springs of various forms constituting an elastic between the hammer and its actuating mechanism, and having a reciprocating movement imparted to them either faster or slower relatively to the movement of the hammer in falling, will be within the substantial mode of operation herein described.

In order to adjust the path of movement of the cylinder more or less with reference to the thickness of an article to be hammered, the eccentric shaft H receives the driving-shaft G, in the manner as hereinbefore mentioned and described.

By laying hold of and rotating the shaft H, or by having any suitable mechanism applied to it for effecting its rotation, the altitude of the shaft G may be varied more or less, so as to produce a corresponding variation in the altitude of the path of movement of the pneumatic cylinder.

I do not claim the combination of a cylinder and piston with a weight or hammer, as such cylinder and piston have been applied to a hammer to raise it by the pressure of steam let into the cylinder, the latter being stationary.

I do not claim a yielding connection between the hammer and its actuating-rod, as that is found in the patent of J. Nasmyth, April 10, 1843.

What I claim as my invention, and desire to secure by Letters Patent, is—

1. In combination with a hammer and an actuating mechanism having a definite reciprocation, the elastic spring or springs, whether of air or other material, interposed between the definite reciprocating mechanism and the hammer, substantially in the manner herein shown and described, so that the extent of motion given to the hammer and the force of its blow may be regulated by the speed of the actuating mechanism, substantially as set forth.

2. A reciprocating pneumatic cylinder having a hole near its central portion, in combination with a piston-rod and hammer, substantially as and for the purposes specified.

3. Adjusting the space between the anvil and the hammer by mechanism constructed and arranged substantially as specified, so as to accommodate different-sized forgings, as set forth.

In witness whereof I have hereunto set my signature this 10th day of July, A. D. 1866.

BENNET HOTCHKISS.

Witnesses:
GEO. D. WALKER,
THOS. GEO. HAROLD.